Patented Aug. 14, 1928.

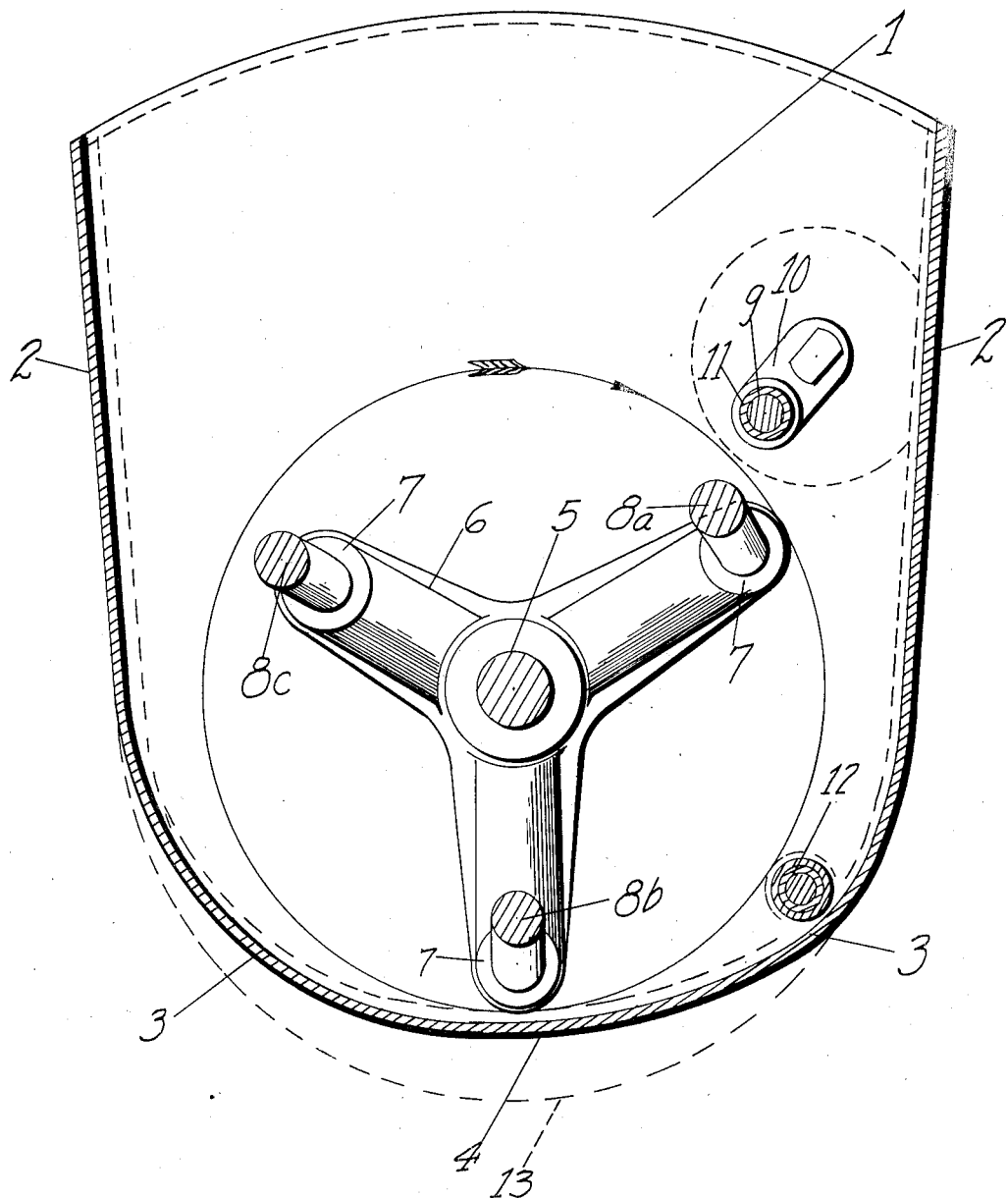

1,680,948

UNITED STATES PATENT OFFICE.

FRANK X. LAUTERBUR AND EDWARD J. LAUTERBUR, OF SIDNEY, OHIO.

DOUGH MIXER.

Application filed April 12, 1927. Serial No. 183,201.

Our invention relates to dough mixers, and particularly to a novel dough mixer in which the contour of the bowl wall is such that a large or small batch of dough may be mixed with the same efficiency.

In our patent application, Serial No. 131,478, filed August 26, 1926, we have shown a dough mixer having a horizontal bar type agitator with an adjustable breaker bar mounted within the bowl above the axis of the agitator, and with a retarding or diverting roller mounted in a corresponding relative position below the axis of the bowl. Further in our application Serial No. 151,802, filed November 30, 1926, we have disclosed a novel process for mixing dough in which a mixer of the type shown in the first noted application, may be used. While for normal charges of dough we find the equipment and the process described will make a very satisfactory mix, we are somewhat handicapped in securing the best results with certain types of dough, which due to the consistency, or to the size of the mix, do not provide a sufficient bulk to be carried around on the agitator without tending to be projected therefrom.

It is the object of our invention to provide in combination with a mixing bowl of the general combination as is disclosed in our co-pending application, Serial No. 131,-478, for a modified shape of bowl, which will enable the more successful operation of the mixer, particularly on small batches of dough. Specifically it is the object of our invention to provide a bowl which instead of having a bottom rounded along the lines of a circle, has a lower extremity which is flattened out, so that the agitator will pick up practically any material which is within the bowl, and which has clearance at the sides, so that frictional engagement is avoided on one side, and space for the retarding roll is provided on the other.

Referring to the drawing in which we have shown a preferred construction:

The figure represents a vertical sectional view taken laterally through a mixer having a bowl shaped in accordance with our invention.

Generally indicated at 1 we have shown an end wall of the mixing bowl. The side walls of the bowl are indicated at 2, with circularly curved portions 3 at the sides of the flattened bottom 4. The agitator which is of the bar type has a central spindle or axle 5 with spiders at each end of the bowl as indicated at 6, and with bars extending across between bosses 7 on the spiders. We have shown the bar 8ª as bowed away from the direction of movement of the agitator, the bar 8ᵇ bowed inwardly toward the axis of the agitator, and the bar 8ᶜ bowed outwardly away from the axis of the agitator. The direction of rotation of the agitator is clockwise, and the length of the spider arms such that the center of each bar will travel through substantially the same path.

We have shown the breaker bar 9 which as indicated is adjustable on a crank arm 10 above the axis of the agitator. The breaker bar 9 has a sleeve 11 rotatably mounted on it, which deflects a dough mass, carried on the agitator in a downwardly direction, and prevents friction against the side walls of the bowl.

In the bottom of the bowl, below the axis of the agitator, is a retarding roll 12 also rotatably mounted, which guides the dough mass away from frictional engagement with the bowl bottom.

It will be observed that a truly circular bowl bottom would extend along the line indicated at 13, and if the bowl bottom were to be shaped accordingly, it is apparent that a pocket of dough mixture would form in the space between the actual bowl bottom 4 and the dotted line 13, which would be out of contact with the agitator. Thus, when a small charge was mixed, there would be some danger of the ingredients not being thoroughly picked up. With the flattened bowl bottom there is ample clearance for the retarding roll 12, and the wall opposite bulges out sufficiently so that the dough will not be thrown against the wall opposite the retarding roll, and so cause friction and too great heating up of the dough during the mixing operation. In this type of mixer, if the dough mixing process is carried out carefully, there will be no danger of friction between the dough mass and the bowl bottom, as the retarding or diverting roll 12 guides the dough mass from being thrown off the agitator bars at a tangent back to the circular path prescribed by the agitator bars. Clearance therefore between the path of the agitator bars and the bowl bottom is not required.

There are various ways of accomplishing results tending toward the same object, such as would be provided by a bowl having a circular bottom with the agitator mounted off center, but we prefer the distorted bowl such as is indicated, because were the bowl bottom to be circular and the agitator off center, there would be a pocket formed in a position beyond a vertical line drawn from the axis of the bowl to the bowl bottom.

There are other modifications which will occur to those skilled in the art without departing from the principle involved, which is essentially the provision of a bowl with little clearance between the deepest part of the bowl and the path of the agitator bars, and substantial clearance at the sides particularly to allow for the retarding or diverting roll. A square bottom tank would provide a similar arrangement, but such a shape would be objectionable because of dough mix forming eddies in the corners of the bottom.

Having thus described our invention what we claim as new and desire to secure by Letters Patent is:—

1. In a dough mixer having a horizontally rotatable bar type agitator, a bowl having a bottom wall with its lowest portion substantially close to the path of movement of the agitator, and with the sides of the bowl adjacent the bottom providing substantial clearance between said sides and the path of movement of the agitator, with a retarding and diverting roll mounted in one of the portions having clearance.

2. In a dough mixer having a horizontally rotatable bar type agitator, a bowl having a bottom wall with its lowest portion substantially close to the path of movement of the agitator, and with the sides of the bowl adjacent the bottom providing substantial clearance between said sides and the path of movement of the agitator, with a retarding and diverting roll mounted in one of the portions having clearance, and with a breaker bar on the same side of the agitator shaft in a position above the axis of rotation of the agitator.

3. In combination with a horizontally rotatable bar type agitator, a mixing bowl having a U shaped bottom with the lowest portion of the bowl bottom relatively flattened out and curved along a line formed on a greater radius than that of the adjoining portions of the bowl bottom, with yielding diverting means mounted in one of the aforenoted adjoining portions of the bowl bottom.

4. In a dough mixer, a horizontally rotatable bar type agitator and a U shaped bowl, with the low point of the U shaped bowl substantially close to the path of movement of the agitator, and with at least one of the sides adjacent the low point substantially bowed out to provide clearance, and with diverting means to guide the dough clear of the bottom, mounted in the outwardly bowed portion.

FRANK X. LAUTERBUR.
EDWARD J. LAUTERBUR.